United States Patent [19]

Frenken et al.

[11] 3,988,398

[45] Oct. 26, 1976

[54] PROCESS FOR SPRAYING MOLTEN MATERIAL

[75] Inventors: Johan W. Frenken; Michael H. Willems, both of Geleen, Netherlands

[73] Assignee: Unie Van Kunstmestfabrieken, B.V., Utrecht, Netherlands

[22] Filed: Nov. 11, 1974

[21] Appl. No.: 523,005

[30] Foreign Application Priority Data

Nov. 15, 1973 Netherlands............... 7315642

[52] U.S. Cl............................ 264/8; 425/8
[51] Int. Cl.²........................... B01J 2/02
[58] Field of Search................. 264/8; 425/8

[56] References Cited
UNITED STATES PATENTS 3,055,049  9/1962  Bruyne et al. .................... 425/8

Primary Examiner—Robert F. White
Assistant Examiner—J. R. Hall
Attorney, Agent, or Firm—Cushman, Darby & Cushman

[57] ABSTRACT

An improved method for spraying molten material in order to obtain solidified grains or prills. Molten material, such as NPK-fertilizer is fed into a symetrical rotating reservoir which rotates about a vertical axis and whose upright walls are provided with apertures for spraying. The interior of the rotating reservoir accommodates a member provided with blades, which member rotates at a speed different from that of the reservoir. The sprayed molten material cools while falling to form solid round prills. The blades inside the reservoir rotate at a speed at least 1.5 times greater than the speed of rotation for the reservoir.

2 Claims, 2 Drawing Figures

PROCESS FOR SPRAYING MOLTEN MATERIAL

BACKGROUND OF THE INVENTION

This invention is directed to an improved process for spraying molten material in order to recover the material as solidified grains. The process employs a symetrical-rotating reservoir which rotates about a vertical axis and whose upright walls are provided with apertures for spraying molten material. The reservoir is designed so as to accommodate a member provided with blades and rotating at a speed different from that of the reservoir. The process and device is suitable for producing such round granular material as used for example in fertilizer products.

A suitable device known in the art for preparing such round granules is described in U.S. Pat. No. 3,055,049 (the contents of which are incorporated herein by reference). According to this prior art device, molten material is fed to the rotating reservoir and sprayed through spray apertures located in the upright wall of the reservoir. The resulting molten material cools when falling a certain distance, and solidifies to form round granules. These round solid granules are conventionally referred to as "prills". The device employed is commonly referred to as a "prilling bucket" or "prilling head", and generally is mounted at the top of a cylindrical tower. As described in the above-mentioned U.S. Patent, the member provided with blades functions as a scraper and maintains the inside of the prilling head free of crusts of molten material while in use. The distance between the edges of the scraper blades and the inner wall of the prilling head may at most be a few millimeters.

Known processes for preparing prills are particularly well adapted for materials which in the molten state maintain a reasonably constant and not too high viscosity such as for example, urea. However, if the molten material to be granulated possesses a high and sometimes variable viscosity such known processes are not entirely satisfactory. These problems occur particularly with the so-called NPK-fertilizers. The unsatisfactory operation of such prior processes is primarily due to the fact that the static pressure difference between the inner surface layer of molten material on the inner wall of the reservoir and the outer wall of the reservoir caused by the centrifugal force in the prilling head, is insufficient to force an adequate amount of the viscous melt through the spray apertures.

Accordingly, it is the primary object of the present invention to provide a process by which it is possible to satisfactorily process material having high and possibly variable viscosity to form prills. In principle, one might suggest feeding the molten material to the reservoir at a elevated pressure. However, this would require the use of a sealing which would be difficult to employ due to temperature and corrosion problems. Also problems arising from the formation of crusts and blocking by solidifying material when the installation is not in use, preclude such sealing means.

SUMMARY OF THE INVENTION

The process according to the present invention offers a solution to the foregoing problems and employs the use of a device as mentioned in the first paragraph above, in which the speed of the member provided with blades (hereinafter referred to as the "pump impeller"), is at least 1.5 times higher than that of the speed of rotation for the reservoir. The pump impeller is driven, during operation, at a speed which is adjusted to the viscosity of the melt and which is considerably higher than that at which the reservoir is driven. As a result, the static pressure of the melt in the reservoir is elevated to such an extent that sufficient material is pressed through the spray aperatures. The required difference in speed between the reservoir and the pump impeller depends upon operating conditions, and if desired, the speed of the pump impeller may be controlled automatically as a function of the viscosity of the molten material in such a manner that a constant yield is obtained.

Generally the speed of rotation of the reservoir will range from between about 200 and 500 revolutions per minute while that of the pump impeller will range from about 300 to 2,000 revolutions per minute. The distance from the inner wall of the reservoir to the ends of the blades of the pump impeller is not critical and may vary within rather wide limits. Preferably, the distance will range from 3 mm to about 10 mm and should not exceed 30 mm.

The minimum speed differential which is observed when carrying out the present invention is much greater than anything envisaged in the abovementioned U.S. Pat. No. 3,055,049. When the inner member of a device as described in that Patent is rotated, its speed may be higher or lower than that of the perforated reservoir, the object being to keep a small speed differential between the inner member and the reservoir sufficient to clean or to reduce clogging of the perforated reservoir wall. By contrast, when carrying out the present invention the pump impeller is rotated much faster than the perforated reservoir; the impeller subjects the infed material to centrifugal forces very much greater than those attributable to the rotation of the reservoir. As a result the static pressure of the melt in the reservoir is raised to such an extent that a continuous discharge of molten material through the spray apertures is maintained, even at high material viscosities.

The above given range for the speed of rotation of the reservoir is a usual range of speeds for prilling buckets used for prilling, e.g. fertilizers. A practical combination of speeds would be: about 350 rpm for the reservoir and 1000–1500 rpm for the pump impeller.

The device employed for spraying the molten material according to the present process invention comprises a rotationsymmetrical reservoir which is mounted on a vertical driveshaft and rotatably therewith. The reservoir is provided with upright walls having aperatures therein for spraying the molten material. The reservoir is further provided with a member therein having blades mounted on a hollow driveshaft which is concentric with the driveshaft of the reservoir.

Both driveshafts of the device are fitted with driving mechanisms which are dimensioned such that during operation, the speed of the pump impeller is at least 1.5 times greater than that of the shaft of the reservoir. Generally the speed of the reservoir will range from between about 200 and 500 revolutions per minute while the speed of the pump impeller ranges from 300 to 2,000 revolutions per minute. It is preferred that the pump impeller have at least three blades and no more than 12 blades.

In order to more fully illustrate the invention, reference is made to the accompanying drawings. However, the drawings are in no way to be construed as limiting the scope of the present invention.

Figure 1:
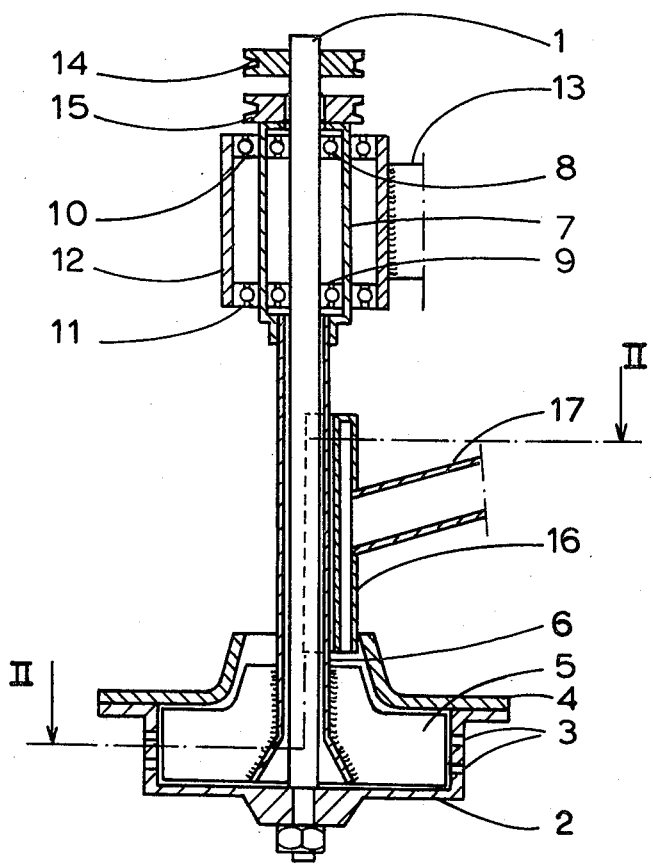
FIG. 1 shows a diagramatic longitudinal section through a prilling head suitable for carrying out the process according to the present invention.
Figure 2:
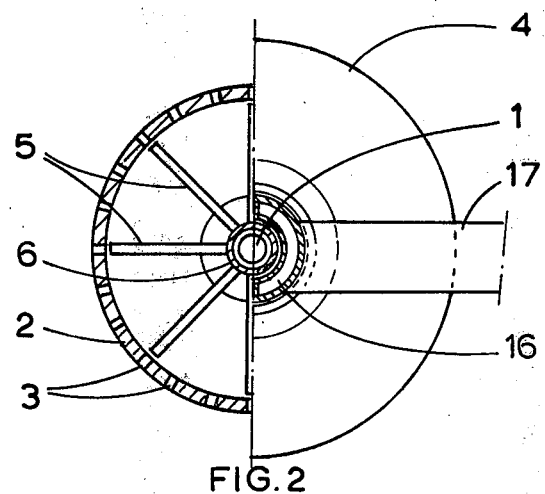
FIG. 2 is a diagramatic cross-section according to II—II of FIG. 1.

Referring to FIGS. 1 and 2, a reservoir 2, the upright walls of which are provided with spray apertures 3, is mounted on a driveshaft 1. The reservoir 2 is fitted with a cover 4. Located in the reservoir 2 and coaxial with it, there is located a pump impeller composed of a number of blades 5. The blades may be fitted, for example by means of welds, to a hollow shaft 6, which concentrically encloses shaft 1 with some clearance. At the end of the hollow shaft 6, a cylindrical sleeve 7 is provided. The cylindrical sleeve 7 is concentric with both the shaft 1 and the hollow shaft 6, and contains two bearings 8 and 9 fitted to support shaft 1. The sleeve 7 itself is supported by two bearings 10 and 11, the bearings being enclosed in a sleeve 12 fitted to a fixed bracket 13. The shaft 1 is provided with a pulley 14 as is the sleeve 7 with a pulley 15. The two pulleys 14 and 15 are part of driving gears by means of which the shaft 1 with the reservoir 2 and the hollow shaft 6 with the blades 5 may be driven independently of each other. Molten material for processing is supplied to the reservoir 2 by means of a feeding member 16 which in crosssection has the shape of a half-ring surrounding the hollow shaft 6. A feed conduit 17 for the molten material is provided. As shown in the drawing, the pump impeller is composed of eight flat radial blades. However, the number and shape of the blades may be varied. For example, the blades may be bent or propeller-shaped. The most desirable shape may be determined with the particular conditions expected.

From the foregoing it is clear that according to the principle of the invention process at a given rotation speed of the reservoir, the amount of molten material fed in may vary as can the viscosity of the molten material. The pump impeller is rotated at a faster speed than the perforated reservoir to achieve increased centrifugal forces so as to maintain a continuous discharge of molten material through the spray apertures even with molten materials having a high viscosity. Clearly, for a satisfactory operation, the amount of molten material fed to the reservoir should not exceed the amount discharged through the spray apertures since this would result in the molten material overflowing from the reservoir cover. In such a case the layer of molten material which forms on the inner wall of the reservoir would exceed its maximum possible thickness and overflow.

To realize the benefit of increased centrifugal force provided by the pump impeller blades, the molten material is in contact therewith.

By way of example, at a given speed of the reservoir from 300 to 350 rpm and a pump impeller speed of 1000 rpm, the amount of material having a constant viscosity fed to the reservoir may vary but should not exceed the amount discharged through the spray apertures. Likewise, at a constant feed amount, the viscosity of the material may vary. When the amount of feed or viscosity level rises to a point where the material would overflow the reservoir, the speed of the impeller unit must be increased to provide sufficient pressure to maintain a continuous discharge of the molten material without exceeding the maximum possible thickness of the layer of molten material which could form on the inner wall of the reservoir without overflowing.

The process can comprise, consist of or consist essentially of the recited steps. The invention in its broader aspects is not limited to the specific details shown and described, but departures may be made from such details within the scope of the accompanying claims without departing from the principles of the invention.

What is claimed is:

1. In a process of spraying molten material and collecting said material as solidified grains by:
   A. feeding molten material into a symmetrical reservoir rotating about a vertical axis, and spraying said molten material through apertures in an upright wall of said reservoir, said reservoir accommodating a centrally positioned member rotating about said axis and provided with blades, and
   B. allowing said molten material sprayed from said reservoir apertures to cool while falling, thereby forming solidified round granules, the improvement which comprises: C. rotating said bladed member having from 3 to 12 blades, the outer ends of said blades spaced a distance of at least 3mm from the inner surface of said upright wall of said reservoir, in the same direction as said reservoir at a speed at least 1.5 times that of said reservoir to thereby raise by centrifugal force the static pressure of a layer of said molten material formed by centrifugal force on the inner surface of said wall of the reservoir to maintain a continuous discharge of molten material through said spray apertures.

2. A process according to claim 1 wherein the speed of rotation of the reservoir ranges between 200 and 500 rpm and the speed of rotation of said member ranges between 300 and 2,000 rpm.

* * * * *